June 4, 1963
T. L. HEYING
3,092,659
ORGANOBORON HYDROXY CARBOXYLIC ACIDS AND THEIR PREPARATION
Filed Nov. 6, 1959
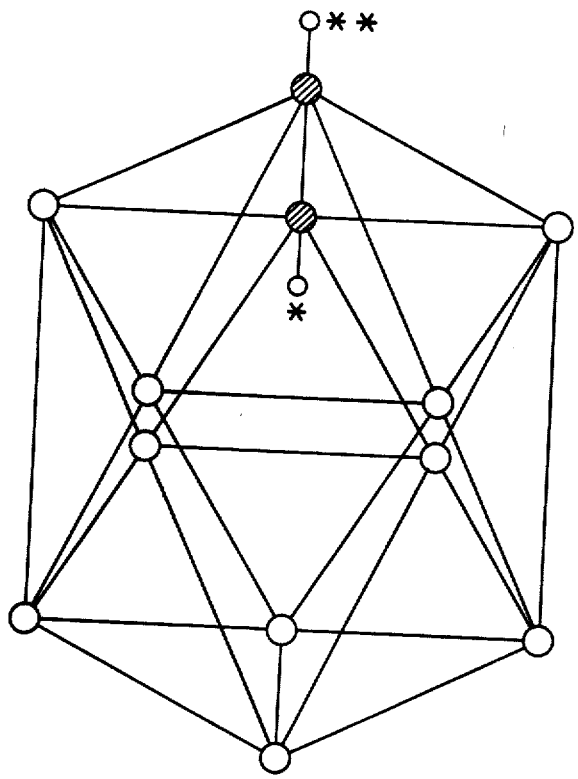
○ BORON
◍ CARBON
○ HYDROGEN ON CARBON
(HYDROGEN ATOMS ON
BORON OMITTED FOR
CLARITY)
*INVENTOR.*
THEDORE L. HEYING
BY
*Adams Forward and McLean*
ATTORNEYS United States Patent Office
3,092,659
Patented June 4, 1963

3,092,659
ORGANOBORON HYDROXY CARBOXYLIC ACIDS AND THEIR PREPARATION
Theodore L. Heying, Tonawanda, N.Y., assignor to Olin Mathieson Chemical Corporation, a corporation of Virginia
Filed Nov. 6, 1959, Ser. No. 851,473
10 Claims. (Cl. 260—535)

This invention relates to organoboron hydroxy carboxylic acids and to a method for their preparation.

Copending application Serial No. 797,809, filed March 6, 1959, describes organoboron esters of the class $RR'B_{10}H_8(CR''CR''')$ wherein R and R' are each hydrogen or an alkyl radical containing from 1 to 5 carbon atoms and wherein one of R'' and R''' is hydrogen and one of R'' and R''' is a radial of the class

wherein $R_1$ is a bivalent saturated hydrocarbon radical containing 1 to 8 carbon atoms and $R_2$ is a benzyl radical or an alkyl radical containing 1 to 6 carbon atoms. For example

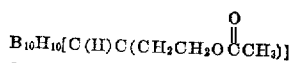

can be prepared by refluxing decaborane with 3-butyn-1-yl acetate while in admixture with acetonitrile and benzene for 103 hours.

According to the present invention it was discovered that compounds of the above class can be reacted successively with an alkali metal alkyl or aryl, carbon dioxide and an aqueous solution of a mineral acid to form a reaction mixture comprising an organic phase and an aqueous phase, and that separation and hydrolysis of the organic phase by reaction with a lower alkanol solution of an alkali metal hydroxide produces an organoboron hydroxy carboxylic acid of the class $RR'B_{10}H_8(CR''CR''')$ wherein R and R' have their previous significance and wherein one of R'' and R''' is a carboxyl group and one of R'' and R''' is a hydroxy-alkyl group containing 1 to 8 carbon atoms.

The solid products prepared in accordance with the method of this invention, when incorporated with suitable oxidizers such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The solid products of this invention when incorporated with oxidizers are capable of being formed into a wide variety of grains, tablets and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

The preferred alkali metal alkyls are the lithium alkyls such as methyl lithium, ethyl lithium, isopropyl lithium, n-propyl lithium, n-butyl lithium, sec-butyl lithium, t-butyl lithium, n-amyl lithium, and the like, since they are soluble in inert organic solvents. Other alkali metal alkyls, such as the sodium and potassium alkyls, however, can also be employed as can the alkali metal aryls including phenyl lithium.

The ratio of reactants can vary widely, generally being within the range of from 0.1 to 10 moles of alkali metal alkyl per mole of organoboron compound and preferably in the range of from 1 to 3 moles of alkali metal alkyl per mole of organoboron compound. The temperature of the reaction of the organoboron compound with the alkali metal alkyl is generally maintained between −90° C. and 50° C. and preferably at or below room temperature. The pressure employed can vary widely, although atmospheric pressure reactions are convenient. The reaction of the alkali metal alkyl with the organoboron compound is substantially instantaneous. Slow addition of the alkali metal alkyl to the reaction mixture is practiced to prevent overheating.

The amount of carbon dioxide employed can also be varied widely, and a large molar excess, such as a tenfold excess or higher, is preferably employed to favor complete carbonation of the organoboron compound. The carbonation reaction in a sealed system at greater than atmospheric pressure is conveniently conducted at room temperature, while atmospheric pressure carbonation is usually cooled to remove the heat of reaction. The pressure employed can vary widely, generally being in the range of from 0.1 to 30 atmospheres, although the reaction proceeds well at atmospheric pressure. The carbonation reaction generally proceeds in about 10 hours to 20 days in a sealed system at above atmospheric pressure, and will occur in 1 to 3 hours at atmospheric pressure.

The carbonation reaction mixture is treated with an aqueous solution of a mineral acid such as hydrochloric acid, sulfuric acid, nitric acid, and the like. The resulting reaction mixture contains in the organic layer an organoboron compound having a free carboxyl group and an ester group.

The organic layer is separated and the ester group is hydrolyzed by reaction with a lower alkanol solution of an alkali metal hydroxide to form the organoboron hydroxy carboxylic acids.

Lower alkanols which can be used are methanol, ethanol, n-propanol, isopropanol, n-butanol, isobutanol, and tertiary butanol, the reactants not being as soluble in the higher alkanols.

Potassium hydroxide is preferred as the alkali metal hydroxide because it is more soluble in the lower alkanol but other alkali metal hydroxides such as sodium and lithium hydroxides can be used.

In the complete absence of water, the ester is hydrolyzed but the alkali metal alcoholate is produced instead of the alcohol. Hence the alkanol solution advantageously contains a small amount of water. The amount of water present should not, however, be so great as to reduce appreciably the solubility of the organoboron ester in the alkali metal hydroxide solution. Separation of the product is then accomplished by acidification of the solution or precipitation of the product from the solution, followed by removal of the product.

The ratio of reactants in the hydrolysis of the organoboron esters can be varied widely, generally being in the range of from 0.01 to 10 moles of alkali metal hydroxide per equivalent of ester (i.e. per mole of carboxylic acid liberated by the hydrolysis) and preferably in the range of from 1 to 6 moles of alkali metal hydroxide per equivalent of ester. Sufficient alcohol can be present to produce a solution containing 1 percent alkali metal hydroxide to a saturated solution of alkali metal hydroxide. The reaction temperature can vary widely, generally being from 0 to 150° C. and preferably between 20 and 80° C. The reaction pressure can vary from subatmospheric to several atmospheres, i.e., from 0.2 to 20 atmospheres, although atmospheric pressure reactions are convenient. The degree of completeness of the reaction can be determined by analysis of the reaction mixture. The reaction generally requires from one tenth to ten hours and preferably from one half to three hours, depending upon the ratio of reactants, the particular reactants and solvents employed and the temperature and pressure of the reaction.

The process of this invention is described in detail in the following example.

Example 23.0 g. (0.1 mole) of $$B_{10}H_{10}[C(H)C(CH_2CH_2O\overset{\overset{O}{\|}}{C}CH_3)]$$

is dissolved in approximately 250 ml. of diethyl ether and an equimolar quantity of n-butyl lithium in n-heptane (2.27 molar solution) is added slowly at room temperature. The resulting solution is cooled to 0 to 10° C. and a slow stream of carbon dioxide is bubbled through. After two hours, the mixture is poured into cold, dilute hydrochloric acid. The mixture is shaken in a separatory funnel and the organic layer is washed with several portions of water. The organic layer is then dried over anhydrous magnesium sulfate and filtered. The solvents are removed under reduced pressure. An oil is obtained which is not further purified, but which is dissolved in 200 ml. of saturated ethanolic potassium hydroxide with cooling sufficient to maintain the temperature at or below 30° C. The solution is stirred overnight at room temperature and poured into a large volume of dilute hydrochloric acid. The resulting solid precipitate of $$B_{10}H_{10}[C(CH_2CH_2OH)C(COOH)]$$

is removed by filtration and air dried (17 g. or about 80 percent yield of crude product).

The boron-containing solid materials produced by practicing the method of this invention can be employed as ingredients of solid propellant compositions in accordance with general procedures which are well understood in the art, inasmuch as the solids produced by practicing the present process are readily oxidized using conventional solid oxidizers, such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron-containing material and 65 to 90 parts by weight of the oxidizer are used. In the propellant, the oxidizer and the product of the present process are formulated in admixture with each other by finely subdividing each of the materials and thereafter intimately mixing them. The purpose of doing this, as the art is well aware, is to provide proper burning characteristics in the final propellant. In addition to the oxidizer and the oxidizable material, the final propellant can also contain an artificial resin, generally of the urea-formaldehyde or phenol-formaldehyde type. The function of the resin is to give the propellant mechanical strength and at the same time improve its burning characteristics. Thus, in the manufacture of a suitable propellant, proper proportions of finely divided oxidizer and finely divided boron-containing material can be admixed with a high solids content solution of partially condensed urea-formaldehyde or phenol-formaldehyde resin, the proportions being such that the amount of resin is about 5 to 10 percent by weight based upon the weight of oxidizer and boron compound. The ingredients can be thoroughly mixed with simultaneous removal of solvent, and following this, the solvent free mixture can be molded into the desired shape as by extrusion. Thereafter, the resin can be cured by resorting to heating at moderate temperatures. For further information concerning the formulation of solid propellant compositions, reference is made to U.S. Patent 2,622,277 to Bonnell and to U.S. Patent 2,646,596 to Thomas.

The compound $B_{10}H_{10}[C(CH_2CH_2OH)C(COOH)]$ of the example has the same structural formula as shown in the accompanying drawing except that the hydrogen atom indicated by the single asterisk is replaced by the radical —$CH_2CH_2OH$ and the hydrogen atom indicated by the double asterisk is replaced by the radical —COOH.

I claim:

1. A process for the preparation of organoboron hydroxy carboxylic acids which comprises reacting successively with a material selected from the class consisting of alkali metal alkyls and alkali metal aryls, carbon dioxide and an aqueous solution of a mineral acid, an organoboron compound of the class $RR'B_{10}H_8(CR''CR''')$ wherein R and R' are selected from the class consisting of hydrogen and an alkyl radical containing 1 to 5 carbon atoms and wherein one of R'' and R''' is hydrogen and one of R'' and R''' is a radical of the class $$R_1O\overset{\overset{O}{\|}}{C}R_2$$

wherein $R_1$ is a bivalent saturated hydrocarbon radical containing 2 to 8 carbon atoms and $R_2$ is selected from the class consisting of a benzyl radical and alkyl radicals containing 1 to 6 carbon atoms the molar ratio of said material to said organoboron compound being within the range 0.1 to 10:1, separating aqueous and organic phases of the resulting mixture, hydrolyzing the organic phase by reaction with sufficient lower alkanol solution of an alkali metal hydroxide to provide 0.01 to 10 moles of alkali metal hydroxide per mole of said organoboron compound, and separating the free acid by treating the organic phase with an aqueous solution of a mineral acid.

2. The method of claim 1 wherein the said material is an alkali metal alkyl.

3. The method of claim 2 wherein the said alkali metal alkyl is n-butyl lithium.

4. The method of claim 1 wherein the organoboron compound is $$B_{10}H_{10}[C(H)C(CH_2CH_2O\overset{\overset{O}{\|}}{C}CH_3)]$$

5. The method of claim 1 wherein the mineral acid is hydrochloric acid.

6. The method of claim 1 wherein the lower alkanol is ethanol.

7. The method of claim 1 wherein the alkali metal hydroxide is potassuim hydroxide.

8. The method of claim 2 wherein the said alkali metal alkyl is n-butyl lithium, wherein the organoboron compound is $$B_{10}H_{10}[C(H)C(CH_2CH_2O\overset{\overset{O}{\|}}{C}CH_3)]$$

wherein the mineral acid is hydrochloric acid, wherein the lower alkanol is ethanol and wherein the alkali metal hydroxide is potassium hydroxide.

9. Organoboron hydroxy carboxylic acids of the class $RR'B_{10}H_8(CR''CR''')$ wherein R and R' are selected from the class consisting of hydrogen and a lower alkyl radical containing 1 to 5 carbon atoms and wherein one of R'' and R''' is a carboxyl radical and one of R'' and R''' is a hydroxyalkyl radical containing 2 to 8 carbon atoms.

10. $B_{10}H_{10}[C(COOH)C(CH_2CH_2OH)]$

No references cited.

UNITED STATES PATENT OFFICE
CERTIFICATE OF CORRECTION

Patent No. 3,092,659            June 4, 1963

Theodore L. Heying

It is hereby certified that error appears in the above numbered patent requiring correction and that the said Letters Patent should read as corrected below.

Column 1, line 17, for "radial" read -- radical --; column 4, line 55, the compound should appear as shown below instead of as in the patent:

Signed and sealed this 24th day of December 1963.

(SEAL)
Attest:

ERNEST W. SWIDER

Attesting Officer

EDWIN L. REYNOLDS

Acting Commissioner of Patents